No. 805,445. PATENTED NOV. 28, 1905.
E. J. BROOKS.
SEAL.
APPLICATION FILED JUNE 30, 1905.
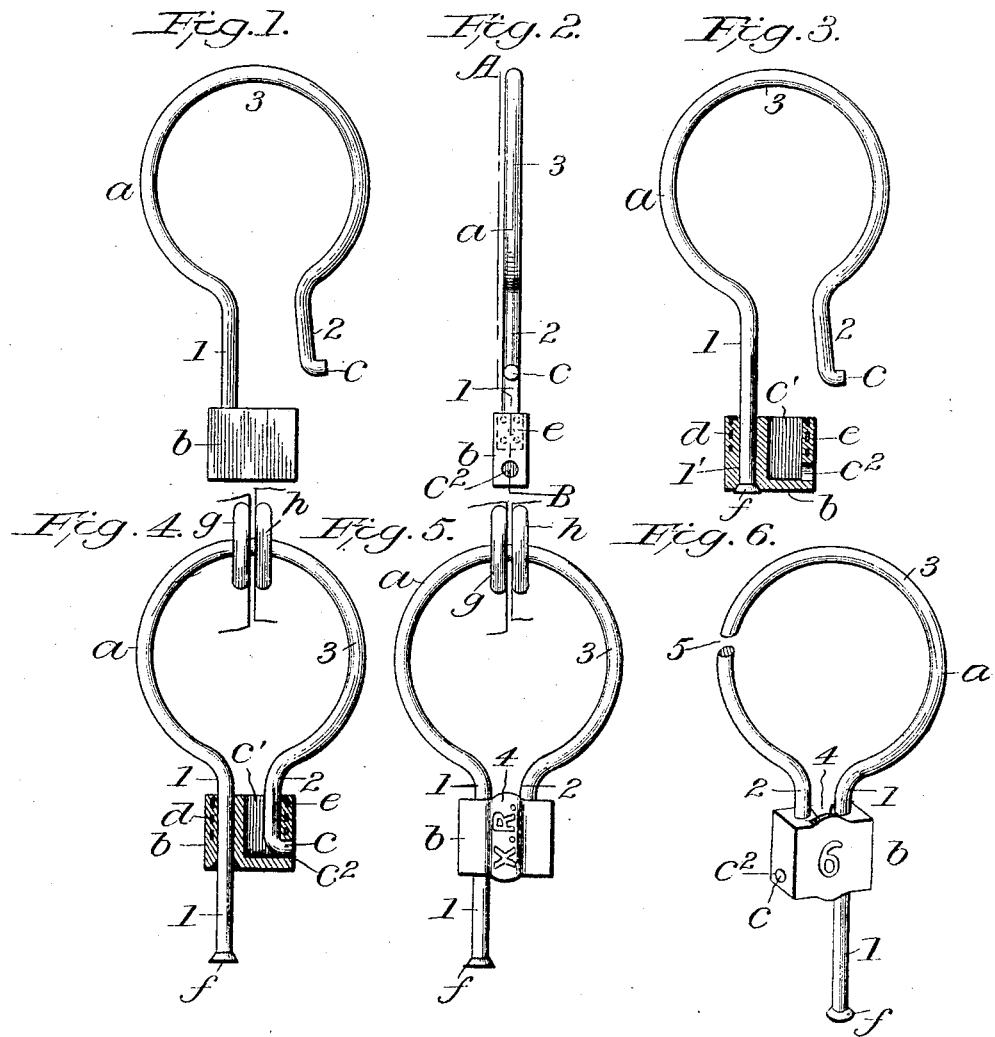
WITNESSES
INVENTOR
Edward J. Brooks
BY
Attorney

UNITED STATES PATENT OFFICE.

EDWARD J. BROOKS, OF EAST ORANGE, NEW JERSEY.

SEAL.

No. 805,445.　　　Specification of Letters Patent.　　　Patented Nov. 28, 1905.

Application filed June 30, 1905. Serial No. 267,745.

*To all whom it may concern:*

Be it known that I, EDWARD J. BROOKS, a citizen of the United States of America, and a resident of East Orange, in the State of New Jersey, have invented a new and useful Improvement in Seals, of which the following is a specification.

This invention relates to those seals designed and adapted for securing the doors of railway-cars and for other like purposes, and more particularly to press-fastened seals of this description in which a shackle of relatively heavy resilient wire is combined with a compressible seal part of lead or equivalent soft metal, hereinafter termed "lead."

The present invention consists in an improved seal of that kind embodying certain novel combinations of parts, as hereinafter described and claimed.

The distinguishing objects of the present invention are to render the parts of such a seal inseparably united at the factory and in such a manner as to facilitate carrying and applying the seal.

A sheet of drawings accompanies this specification as part thereof.

Figure 1 is a face view of an improved seal embodying the whole of the present invention, the same being shown as it leaves the factory, with its parts inseparably united with each other. Fig. 2 is an edge view projected from Fig. 1. Fig. 3 represents a section on the line A B, Fig. 2. Fig. 4 is a sectional face view of the improved seal applied to a pair of car-door staples. Fig. 5 is a face view of the same seal press-fastened, and Fig. 6 is a perspective back view of the press-fastened seal detached.

Like reference characters refer to like parts in all the figures.

The improved seal is composed of a shackle-wire $a$, preferably of steel wire as heavy as may be required, and a compressible seal part $b$, of lead, by which the ends of the shackle-wire are permanently united when the seal is press-fastened by the application thereto of a suitable seal-press. One of the ends 1 and 2 of the shackle-wire $a$ terminates in an L-shaped hook $c$, and the seal part $b$ is provided at the factory with a matching L-shaped recess $c'$, the lateral portion of which (shown at $c^2$) extends through the adjacent edge of the seal part, as shown in Figs. 2, 3, and 6. The body of the shackle $a$ is a resilient bow 3, which adapts the shackle ends 1 and 2 to be sprung together to admit said hook and renders the hook self-fastening.

The seal is preferably press-fastened by an indentation 4 in the seal part $b$ between the shackle ends, whereby the recess $c'$ is closed behind the hook $c$, so as to prevent the disengagement of its extremity from said horizontal portion of the recess without closing or obstructing the latter, so that the extremity of the shackle-wire $a$ is exposed to view, as in Fig. 6, after the seal is press-fastened, and the concealment of any tampering with the seal is to this extent prevented.

The seal part $b$ is conveniently provided, if desired, with inclosed hard-metal guards $d$ and $e$ (represented in Figs. 2, 3, and 4) to protect the same against the release of either shackle end by cutting through the lead. Such guards are set forth in my specification forming part of United States Letters Patent No. 321,275, dated June 30, 1885, and form no part of the present invention.

The shackle-wire $a$ and seal part $b$ are inseparably united with each other at the factory by a rivet-head $f$ on an elongated straight shackle end 1, which is slidable within a hole 1' in the seal part, so that when the seal is carried by the shackle-wire $a$ the seal part $b$ drops into the position represented in Figs. 1, 2, and 3 and exposes the hook $c$ above the recessed upper edge of the seal part $b$, so as to facilitate the application of the shackle-wire $a$ to a pair of car-door staples $g$ and $h$ or the like. After the seal is thus applied the seal part $b$ is moved upward and the shackle end 2, carrying the hook $c$, is sprung into the L-shaped recess $c'$ in the seal part $b$, so as to preliminarily fasten the seal, as in Fig. 4, preparatory to the press-fastening operation. The seal-press is then applied to the seal part $b$ and said hook $c$ is permanently interlocked with the seal part $b$, as in Figs. 5 and 6. In so press-fastening the seal a sufficient indentation 4 is formed in the face of the seal, and the lead is provided within this indentation with a suitable distinguishing-mark consisting, preferably, of the initials or name of the railroad, (represented by the letters "X R" in Fig. 5,) and the reverse side (shown in Fig. 6) is at the same time provided, for example, with the number of the station at which the seal is pressed, as represented by "6" in Fig. 6. To remove the seal, the shackle-wire $a$ is cut, as represented at 5 in Fig. 6.

The external shape of the seal part *b* may obviously be changed without materially changing the seal, and other like modifications will suggest themselves to those skilled in the art.

Having thus described said improvement, I claim as my invention and desire to patent under this specification—

1. The combination, in a seal, of a shackle-wire having a resilient bow and a pair of shackle ends, one of them straight elongated and provided with a separation-preventing stop, and the other in the form of a hook, and a compressible seal part of lead adapted to permanently connect said shackle ends when the seal is press-fastened, said seal part being constructed with a hole within which said straight shackle end is slidable to open and close the seal preparatory to the press-fastening operation and with a recess adapted to interlock with said hook.

2. The combination, in a seal, of a shackle-wire having a resilient bow and a pair of shackle ends one of them straight elongated and provided with a separation-preventing stop, and the other in the form of an L-shaped hook the extremity of which projects laterally outward, and a compressible seal part of lead adapted to permanently connect said shackle ends when the seal is press-fastened, said seal part being constructed with a hole within which said straight shackle end is slidable to open and close the seal preparatory to the press-fastening operation, and with an L-shaped recess adapted to interlock with said hook and including a lateral portion fitted to its said extremity and extending outward through the adjacent edge of the seal part, whereby the parts are adapted to be inseparably connected with each other at the factory and both extremities of the shackle-wire are exposed to view after the seal is press-fastened, substantially as hereinbefore specified.

EDWARD J. BROOKS.

Witnesses:
   W. M. BROOKS,
   THEODORE D. GOTTLIEB.